United States Patent [19]

Lemercier

[11] Patent Number: 4,759,898
[45] Date of Patent: Jul. 26, 1988

[54] FAST NEUTRON NUCLEAR REACTOR HAVING AN IMPROVED CORE COVER PLUG

[75] Inventor: Guy Lemercier, Le Puy Sainte Reparade, France

[73] Assignee: Commissariat a l'Energie Atomique, Paris, France

[21] Appl. No.: 912,002

[22] Filed: Sep. 26, 1986

[30] Foreign Application Priority Data

Oct. 3, 1985 [FR] France .................. 85 14673

[51] Int. Cl.⁴ ............................................ G21C 15/02
[52] U.S. Cl. ................................. 376/290; 376/377; 376/389; 376/399
[58] Field of Search ............... 376/290, 377, 389, 399, 376/404, 405

[56] References Cited

U.S. PATENT DOCUMENTS 4,309,252 1/1982 Gilroy .................. 376/290

FOREIGN PATENT DOCUMENTS 0108691 5/1984 European Pat. Off. .
0127539 12/1984 European Pat. Off. .
2289031 5/1976 France .
2486295 1/1982 France .
0090080 5/1984 Japan .................. 376/290
0128481 7/1984 Japan .................. 376/290

OTHER PUBLICATIONS

Nuclear Technology, vol. 68, No. 2, Feb. 1985, pp. 135-145, La Grange Prk, Ill., US: J. Branchu et al.: "Superphenix 1 Reactor Block Fabrication".

Primary Examiner—Charles T. Jordan
Assistant Examiner—Richard W. Wendtland

[57] ABSTRACT

In a liquid metal-cooled fast neutron nuclear reactor which has a vessel sealed by a horizontal slab on which is suspended a core cover plug, the lower part of said plug comprises a deflecting grid, optionally duplicated by a thermal protection grid. Each of the grids is formed from a peripheral plate and modular plates defining between them passages for the liquid metal. The peripheral plates can be fixed to a perforated part of an external ferrule or can be suspended on a core cover plate by tie bolts and/or by certain of the control rod guidance sleeves. The modular plates are fixed to the other sleeves and traversed by sodium sampling tubes and tubes for housing thermocouples.

9 Claims, 4 Drawing Sheets

FAST NEUTRON NUCLEAR REACTOR HAVING AN IMPROVED CORE COVER PLUG

BACKGROUND OF THE INVENTION

The present invention relates to a liquid-metal cooled fast neutron nuclear reactor having a vessel closed by a horizontal slab on which is suspended a core cover plug. In such a reactor, the invention more particularly relates to the core cover plug.

In fast neutron nuclear reactors, the reactor core is placed in a main vessel filled with liquid metal and generally constituted by sodium. This liquid metal is used for transferring to heat exchangers, the heat produced by the fission reaction occurring in the reactor core. The circulation of sodium between the core and the exchangers is assured by pumps.

In reactors of the integrated type, the heat exchangers and pumps are also placed within the main reactor vessel. An inner vessel then defines within the main vessel a hot collector containing the sodium leaving the reactor core and a cold collector containing the sodium leaving the heat exchangers.

In fast neutron nuclear reactors, the expression "core cover plug" is used for designating a group of parts suspended on the slab sealing the main vessel and located above the reactor core. This group or assembly comprises a plug sealing a central opening formed in the slab, a subassembly called the "core cover" and located immediately above the core, as well as the parts by which the core cover is suspended on the plug.

The core cover has the double function of making it possible to monitor and check the reactor core, as well as deflecting the jet of hot sodium leaving the core towards the heat exchangers.

In order to monitor the core, the core cover generally also comprises liquid sodium sampling tubes serving to detect and locate any fractures to cans in the reactor core, as well as smaller diameter tubes housing thermocouples.

In order to make it possible to check the fission reaction in the reactor core, the core cover plug has vertically axed, large diameter guide tubes or sleeves permitting the passage of control rods made from neutron-absorbing materials and vertical command bars on which the rods are normally suspended.

Finally, the deflection of the sodium jet from the reactor core towards the heat exchangers is obtained by means of one or more deflectors located in the immediate vicinity of the core.

Thus, in a fast neutron nuclear reactor, the core cover plug constitutes an important component with respect to the thermohydraulic behaviour of the sodium in the hot collector.

Thus, calculations show that the lower compartment of the core cover plug must have a high porosity, in order that the hot sodium jet leaving the core is deflected and channelled radially towards the heat exchangers through this compartment. Thus, an inadequate porosity leads to the passage of an important proportion of the sodium beneath the core cover plug, which disturbs the flow, particularly at the free surface of the sodium, which must remain as calm as possible.

The thermohydraulic behaviour of the sodium within the hot collector must limit to the greatest possible extent the thermal stressing to which the structures such as the internal vessel or the core cover plug are exposed. These thermal stresses must be relatively small in order to ensure the long-term mechanical behaviour of these structures.

These thermohydraulic conditions which have to be fulfilled in the hot collector become even more difficult to obtain with an increase in the compactness of said collector or in the liquid sodium flowrate in the core. These conditions are also more difficult to respect when a fuel assembly storage area is provided in the hot collector, when use is made of an internal vessel with a single step or when the hydrostatic charge between the upper plane of the core and the free level of the sodium is low.

French Pat. No. 2,289,031 describes a fast neutron nuclear reactor having a core cover plug mainly formed by an external ferrule which is perforated in its lower part and a certain number of perforated horizontal plates located immediately above the core.

Although such a structure can be used when the hereinbefore defined thermohydraulic conditions are not too difficult, its use is virtually impossible when these conditions are stricter, e.g. under the influence of one or more of the factors referred to hereinbefore. Thus, the perforations formed in the lower plates of the core cover plug define a porosity limit, which can, if exceeded, lead to a deterioration in the mechanical behaviour of the structure.

Comparable observations can be made with respect to the core cover plug described in French patent application 83 08734, in which conical or truncated cone-shaped deflecting plates are suspended on the sleeves, immediately above the core. Thus, even though the structure of this core cover plug is lighter than that described in the preceding document, which makes it possible to reduce its thermal inertia, this is carried out to the detriment of the porosity of the lower part of the core cover plug. Therefore disturbances can occur on the free surface of the sodium in the hot collector.

SUMMARY OF THE INVENTION

The present invention relates to a fast neutron nuclear reactor having a core cover plug satisfying the most strict thermohydraulic conditions in the hot collector, whilst still having a relatively simple structure, the mechanical behaviour thereof in the lower part of the core cover plug being ensured by auto-lift.

The present invention therefore specifically relates to a liquid metal-cooled fast neutron nuclear reactor having a vessel closed by a horizontal slab on which is suspended a core cover plug, the latter having a vertically axed external ferrule surrounding control rod guidance sleeves and also vertically axed liquid metal sampling tubes, said ferrule supporting a horizontal core cover plate transversed by sleeves and tubes, wherein the core cover plug also comprises at least one grid located below the core cover plate and having a horizontal, annular, peripheral plate connected in fixed manner to the core cover plate and horizontal modular plates, each of the latter being fixed to at least one of the sleeves and/or tubes, said modular plates and the peripheral plate defining between them passages for the liquid metal.

The term modular plate is understood to mean a metal plate whose main dimensions and centre-to-centre distances are multiples or submultiples of the installation spacing of the assembles in the core. By fixing each of these modular plates to at least one sleeve, it is possible to bring about a more or less close "paving" of the interior of the ferrule, so as to effectively protect the core cover plate from the direct impact of the hot sodium jets from the core and to correctly channel the flow of said sodium towards the hot collector, without causing mechanical behaviour problems for the said structure.

According to a first embodiment of the invention, the modular plates and the peripheral plate of the same grid are located in the same horizontal plane and form between them clearances defining said passages.

According to a second embodiment of the invention, the modular plates are vertically upwardly displaced on moving away from the external ferrule axis.

According to a third embodiment of the invention, the modular plates are vertically displaced towards the bottom whilst moving away from the external ferrule axis.

In the second and third embodiments of the invention, the edges of the adjacent modular plates can be vertically aligned, can form between them clearances in a horizontal direction, or can conversely partly overlap in a horizontal direction.

In a first constructional variant of the invention, the external ferrule is fixed to the peripheral plate and has perforations below the core cover plate.

According to another constructional variant of the invention, the lower end of the external ferrule is fixed to the core cover plate and the peripheral plate is suspended on the core cover plate by tie bolts.

In the latter case, the external diameters of the core cover plate and the peripheral plate can slightly exceed the external diameters of the external ferrule, a break then being provided on the periphery of the peripheral plate for the passage of handling means for the assemblies constituting the reactor core.

According to another feature of the invention, the core cover plug comprises a deflecting grid located in the vicinity of the lower ends of the sleeves and tubes and a grid forming a heat shield located between the deflecting grid and the core cover plate.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
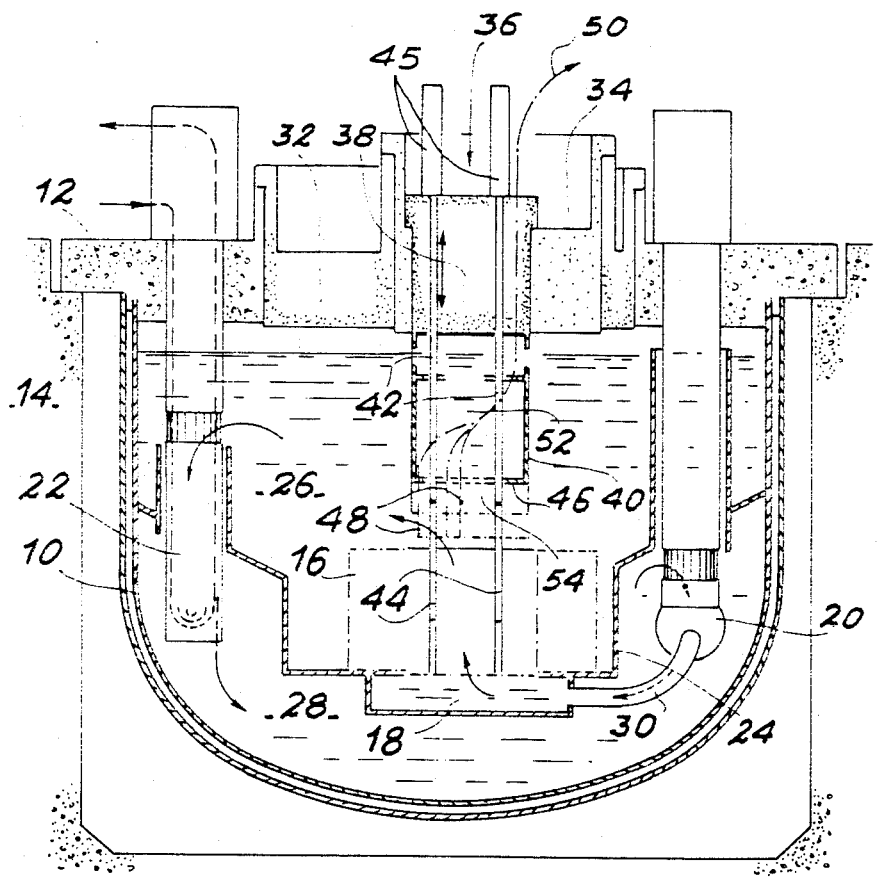
FIG. 1 A diagrammatic vertical sectional view of a fast neutron nuclear reactor according to the invention.

The fast neutron nuclear reactor shown in FIG. 1 comprises in per se known manner a vertically axed main vessel 10, which is sealed at its upper end by a horizontal closing slab 12. Vessel 10 is located within a concrete building 14, on which bears the periphery of slab 12.

Vessel 10 is filled with liquid sodium surmounted by a neutral gas atmosphere in the vicinity of slab 12. The reactor core 16 is located in the central part of vessel 10 on a supply and support bearing member 18. Pumps 20 and heat exchangers 22 suspended on slab 12 are located in the vessel 10 around core 16.

An internal vessel 24 defines within the main vessel 10, a hot collector 26 and a cold collector 28. Hot collector 26, which is mainly located above the internal vessel 24 and the core 16 contains the hot sodium leaving the core and entering the heat exchangers 22. The cold collector 28, positioned below the internal vessel 24 and the bearing member 18, contains the relatively cold sodium leaving heat exchangers 22 and sucked in by pumps 20. The latter then supply the sodium to the bearing member 18 via pipes 30.

In its central part, slab 12 has a large rotary plug 32 and a small rotary plug 34, whereof the axis is off centered with respect to that of the large rotary plug 32. In known manner, handling means such as arms for pokers are suspended on the small rotary plug 34. These handling means are not shown in FIG. 1 so as not to overburden the drawing. They are responsible for the loading and unloading of assemblies constituting the reactor core 16 using combined rotations of rotary plugs 32, 34.

The core cover plug 36 to which the present invention more specifically relates is suspended on the small rotary plug 34, so as to be positioned vertically above the reactor core 16. In per se known manner, it comprises a plug 38 located in an opening formed in the small rotary plug 34.

A vertically axed, cylindrical external ferrule 40 is suspended on plug 38. Within said ferrule 40 are provided cylindrical tubes or sleeves 42, which have also vertical axes. These sleeves 42 are used for the passage of control rods 44 made from a neutron absorbing material and not shown vertical bars, on which the said rods are normally suspended. In known manner, the greater or lesser introduction of control rods 44 into reactor core 16, controlled by mechanisms 35 mounted on plug 38, makes it possible to control the fission reaction in the core and consequently to control the reactor.

Figure 3:
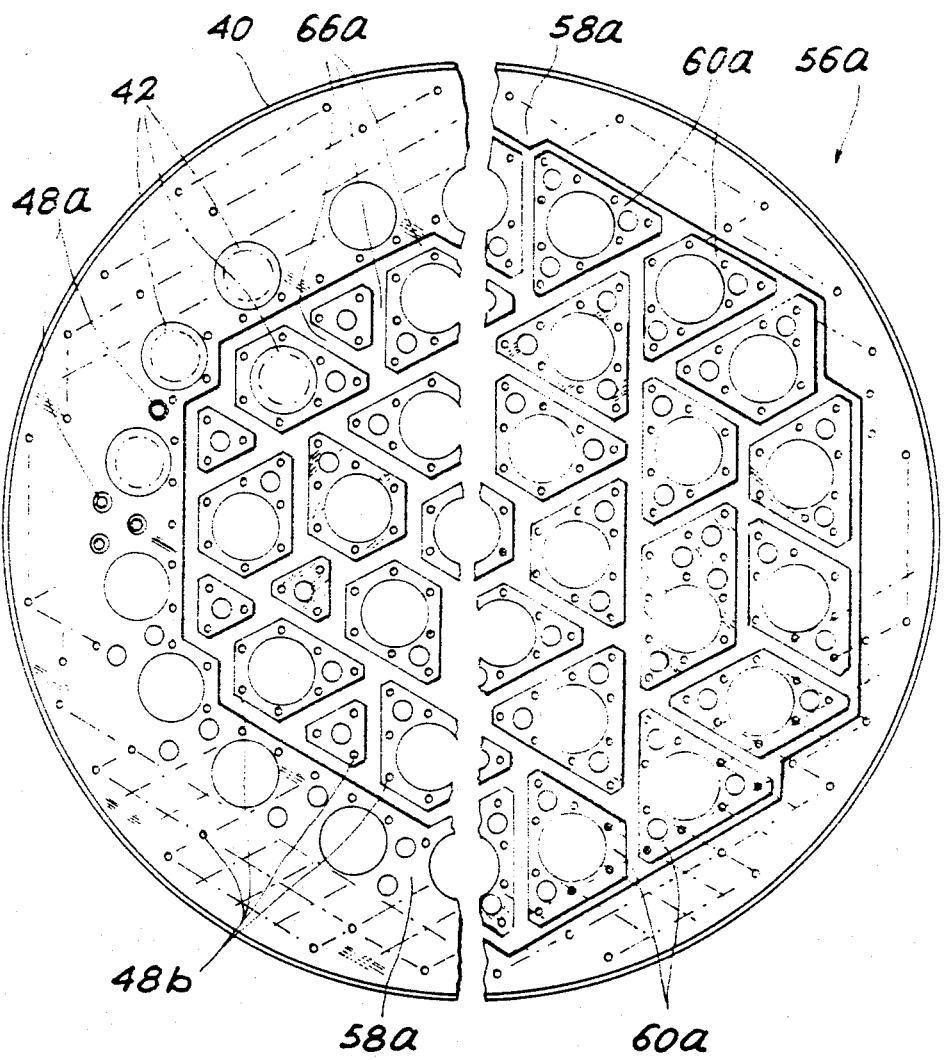
FIG. 3 A plan view according to plane III—III of FIG. 2.
Figure 5:
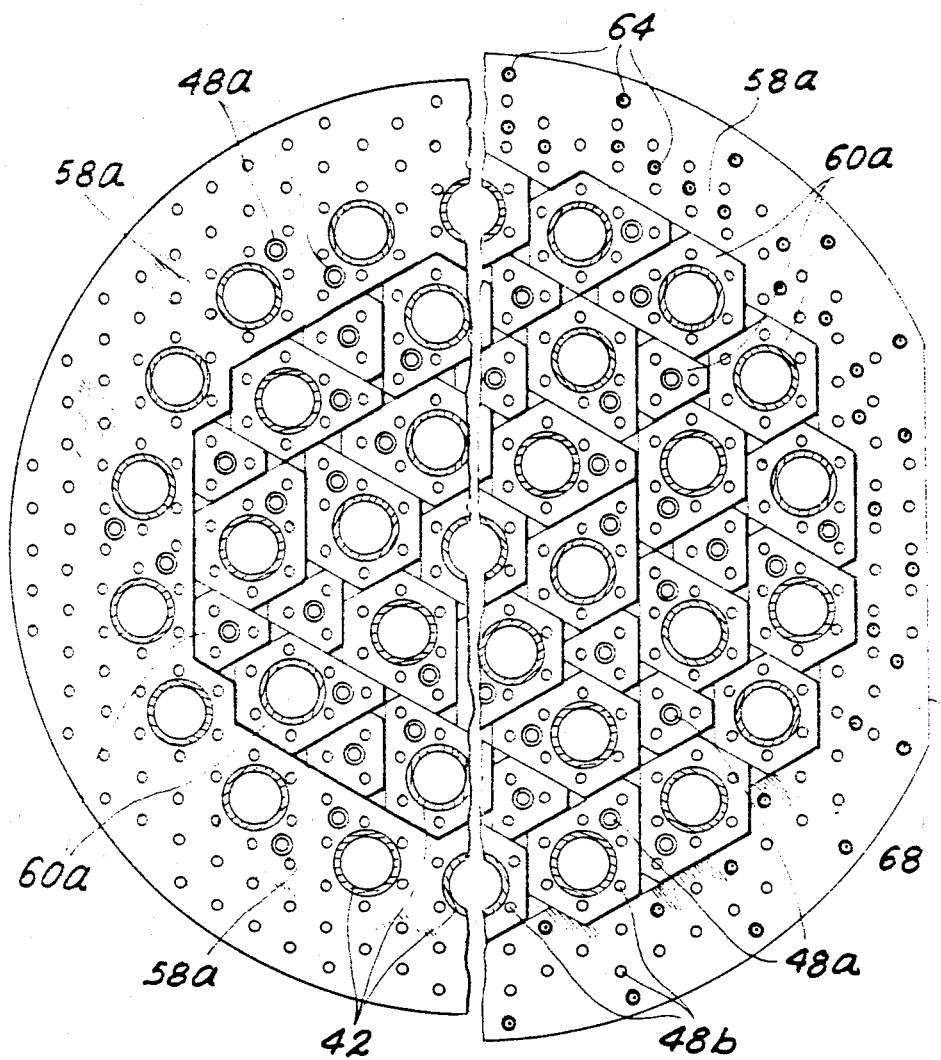
FIG. 5 A plan view along V—V of FIG. 4.

A horizontal core cover plate 46 is peripherally welded to the external ferrule 40 and is traversed relatively tightly by sleeves 42. This plate is also traversed by vertically axed tubes 48. As illustrated in FIGS. 3 and 5, certain of these tubes 48 (48a) make it possible to sample sodium at the core outlet, whilst other tubes (48b), which have a smaller diameter receive thermocouples making it possible to measure the temperature at different points of the core outlet. These tubes 48 are connected to not shown external instrumentation by tubes 50 (FIG. 1).

Within the core cover plug 36, the core cover plate 46 defines an upper zone 52 and a lower zone 54.

The present invention specifically relates to the construction of the lower zone 54. For this reason, different embodiments of said zone are shown on a larger scale in the left and right-hand halves of FIGS. 2 and 3 and FIGS. 4 and 5.

Figure 2:
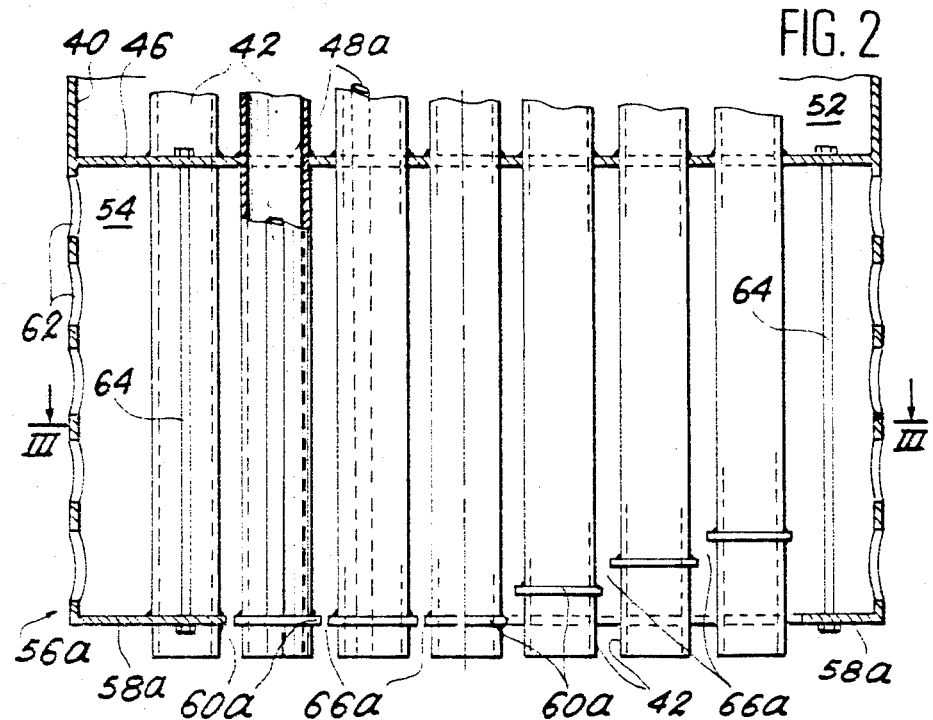
FIG. 2 A vertical sectional view showing on larger scale the lower end of the core cover plug, the left and right-hand halves of the drawing illustrating two embodiments of the invention.

FIGS. 2 and 3 show the case where sleeves 42 and sodium sampling tubes 48a support a single grid 56a in the vicinity of their lower end. This grid 56 constitutes a deflecting grid for the sodium leaving the reactor core. It comprises a horizontal, annular, peripheral plate 58a and in its central portion modular horizontal plates 60a.

In the embodiment shown in FIG. 2, the outer ferrule 40 is extended downwards beyond the core cover plate 46 and its lower end is welded to the outer peripheral edge of annular plate 58a. That part of ferrule 40 located below the core cover plate 46 is then provided with perforations 62 regularly distributed over its entire height and periphery. The supporting of annular plate 58a is completed by tie bolts 64 regularly distributed about the vertical axis of ferrule 40 and rigidly connecting plates 46 and 58a.

As illustrated in the plan view of FIG. 3, sleeves 42 are distributed in the form of three concentric rings around a central sleeve, whose axis coincides with the vertical axis of ferrule 40.

In the embodiment shown in exemplified manner in the left-hand halves of FIGS. 2 and 3, the sleeves 42 of the outer ring traverse the peripheral plate 58a. However, in the embodiment shown in the right-hand halves of FIGS. 2 and 3, no sleeve 42 passes through the peripheral plate 58a.

Each of the modular plates 60a is fixed to one of the sleeves 42 and/or to at least one of the tubes 48a used for sampling sodium. These modular plates 60a constitute the central part of grid 56a and are traversed by all the sleeves 42 and tubes 48a, 48b, which do not traverse the peripheral plate 58a. These modular plates 60a, as well as the annular plate 58a define between them passages 66a enabling the sodium leaving the reactor core to flow upwards, whilst deflecting its flow radially towards the heat exchangers.

As illustrated by the left-hand halves of FIGS. 2 and 3, these passages 66a can be obtained by placing plates 58a and 60a at the same level and by providing a clearance between the adjacent edges of these plates.

As illustrated by the right-hand half of FIG. 2, the section of the passages 66a formed by grid 56a can be increased by upwardly displacing the level of plates 60a on moving away from the vertical axis of ferrule 40. In this case, peripheral plate 58a is preferably located at the same level as plate 60a fixed to the central sleeve 42.

Figure 4:
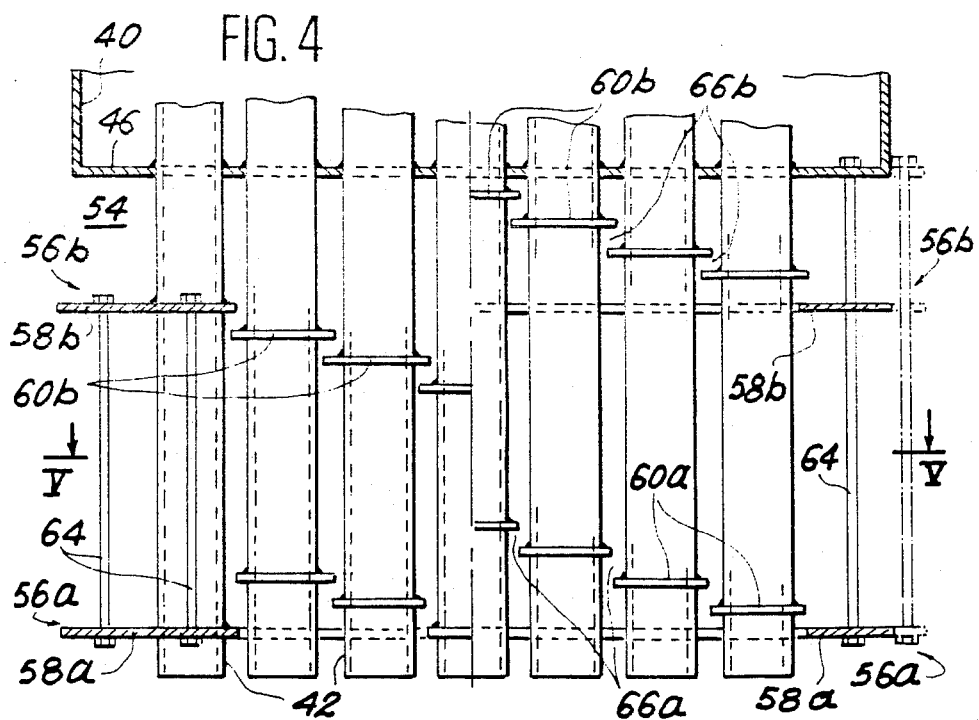
FIG. 4 A view comparable to FIG. 2, the left and right-hand halves thereof illustrating two other embodiments of the invention.

As is illustrated by the right-hand half of FIG. 4, the section of passages 66a formed by grid 56a can also be increased by downwardly displacing the level of plates 60a, 58a on moving away from the vertical axis of ferrule 40.

Obviously, in these two latter cases, the heightwise displacement between plates 58a and 60a of grid 56a can be adequate to give the passages 66a defined between the plates the desired cross-section. Thus, as illustrated in FIGS. 4 and 5, the clearances between adjacent edges of plates 58a, 60a can be eliminated and then said edges can be vertically aligned.

If the heightwise displacement between plates 58a, 60a forming grid 56a is adequate, the adjacent edges of plates 58a, 60a may not even overlap. This arrangement makes it possible to axially increase the baffle encountered by the sodium jets leaving the reactor core, which facilitates their rapid removal towards the periphery of the lower compartment 54 of the core cover plug and prevents direct impact of said hot sodium jets on the core cover plate 46.

FIG. 4 shows the case where a second grid 56b is interposed between the deflecting grid 56a and the core cover plate 46. Grid 56b fulfils a heat shield function. During temporary operating periods of the reactor, it protects the core cover plate 46 from hot or cold sodium jets leaving the core.

Grid 56b is essentially constructed in the same way as deflecting grid 56a. In particular, it comprises a horizontal, annular, peripheral plate 58b and modular plates 60b constituting the central part of the grid. Like those (60a) of grid 56a, each of the modular plates 60b is fixed to a sleeve 42 and/or to at least one sodium sampling tube 48b.

In the left-hand half of FIGS. 4 and 5 is shown the case where the two peripheral plates 58a, 58b are traversed by sleeves 42 of the outer ring. The right-hand half of FIGS. 4 and 5 show the case where none of the sleeves 52 traverses peripheral plates 58a, 58b.

FIG. 4 shows an embodiment in which the external ferrule 40 stops level with the core cover plate 46, the lower end of ferrule 40 being welded to the peripheral edge of plate 46.

In the case where plates 58a, 58b are traversed by the sleeves 42 of the peripheral ring (left-hand halves of FIGS. 4 and 5), said sleeves partly support plates 58a, 58b.

Preferably, said supporting is completed by tie bolts such as 46. These tie bolts can either be placed solely between plates 58a and 58b, as illustrated in the left-hand half of FIG. 4, or between the core cover plate 46 and plate 58a of deflecting grid 56a. Two rows of tie bolts arranged in staggered manner can also be respectively positioned between plates 58a and 58b and between plates 46 and 58b.

In the same way as plates 60a of grid 56a, plates 60b of grid 56b are positioned so as to form between their adjacent edges baffle passages 66b for the sodium leaving the reactor core. These passages can be obtained in the same way as for grid 56a, either by placing all the plates at the same level and providing clearance between their adjacent edges, or by displacing the level of the plates with respect to one another, as illustrated in FIG. 4. In the latter case, the level of plates 60b and 58b can increase on moving away from the vertical axis of ferrule 40, or decrease on moving away from said same axis. These two situations are respectively shown in the left and right-hand halves of FIG. 4.

When such a heightwise displacement exists between plates 60b and 58b, three constructional variants are possible, as for grid 56a. Thus, a clearance in a horizontal direction can be provided between adjacent edges of the plates. This clearance can also be eliminated, the adjacent edges of the plates then being vertically aligned. Finally, the adjacent edges of the plates can also overlap. Only the latter situation is shown in FIG. 4.

In the case shown in FIG. 4, where the core cover plug comprises grids 56a, 56b, they can be produced either in exactly the same way, or differently. Thus, the plates constituting grid 56a can all be placed at the same level, whereas the plates constituting grid 56b are vertically displaced, or vice versa.

In the same way, the modular plate 60a of grid 56a can be vertically upwardly displaced, whereas those (60b) of grid 56b are vertically downwardly displaced from the axis of ferrule 40, or vice versa.

Finally, even in the case where the two grids 56a and 56b are formed from modular plates located in the same plane or are displaced in the same direction as illustrated by the left and right-hand halves of FIG. 4, the passages 66a, 66b formed between the plates can differ. This difference can result either from a different vertical displacement between the plates, or different overall dimensions of the plates, depending on whether they belong to grid 56a or grid 56b. The left and right-hand halves of FIG. 4 illustrate an example of this situation. In this case, the adjacent edges of plates 58a, 60a constituting the grid 56a are vertically aligned, whereas the adjacent edges of plates 58b, 60b constituting grid 56b overlap.

The shapes of the modular plates 60a, 60b, each forming the grids of the core cover plug are determined as a function of the reference grid or network formed by sleeves 42 and tubes 48a, 48b, whilst taking account of the fact that each of these sleeves supports at a maximum one plate and that all the tubes and sleeves traverse one of the plates of each of the grids 56a, 56b. The two assemblies formed by the annular plates 58a, 58b and by the modular plates 60a, 60b thus form two grids 56a, 56b defining between adjacent plates passages 66a, 66b of a given cross-section.

As is more particularly illustrated by the left-hand halves of FIGS. 3 and 5, when the tubes and sleeves are distributed in accordance with a hexagonal reference grid, these different requirements can lead to the modular plates being given the following shapes:

equilateral triangle truncated at the angles for the smallest plates traversed solely by a sodium sampling tube and by three tubes for housing thermocouples, hexagon for the plates traversed by a sleeve and by six tubes for housing thermocouples, hexagon, plus triangle joined for the plates traversed by a sleeve, a sodium sampling tube and seven tubes for housing thermocouples.

In a variant shown in the right-hand half of FIG. 3 enabling all the modular plates to be supported by a sleeve, the shapes of the plates differ slightly:

hexagon traversed by the central sleeve and by six tubes for housing thermocouples, isosceles trapezium traversed by a sleeve, two sodium sampling tubes and eight tubes for housing thermocouples, parallelogram traversed by a sleeve, four sodium sampling tubes and eleven tubes for housing thermocouples, equilateral triangle traversed by a sleeve, three sodium sampling tubes and nine tubes for housing thermocouples.

In the right-hand half of FIGS. 4 and 5 are also shown a constructional variant according to the invention in which the external peripheral diameter of the annular plates 58a, 58b and the core cover plate 46 slightly exceeds the external diameter of ferrule 40. This configuration enables the deflecting grid 56a to project slightly over the periphery of the central fissile zone of the reactor core, thus ensuring the covering and deflection of the sodium jet leaving the final ring of fuel assemblies of the reactor core. This variant is of interest, because the flowrate of the sodium traversing the peripheral assemblies is high and could disturb the flow of sodium into the hot collector if it was not completely covered by the core cover plug.

In this case and as more particularly illustrated in the right-hand half of FIG. 5, a break e.g. formed by a flat 68 is formed on the periphery of ring 58a. This flat 68 enables the handling arm suspended on the small rotary plug and not shown in the drawings to perform a complete rotation. This flat also makes it possible to retract the handling arm during the operation of the reactor into a position parallel to the sodium flow lines into the hot collector. Thus, no turbulence is produced in the hot collector.

The different embodiments described in non-limitative manner hereinbefore show that the use of one or two deflecting grids constituted in their central parts by modular plates supported by sleeves and tubes, permits a large number of different configurations. Thus, the porosity of the lower zone 54 of the core cover plug and the deflection of the sodium jets leaving the core can be determined with high precision to satisfy the particular thermohydraulic conditions imposed in the hot collector. The plates forming the grids have auto-lift characteristics, so that the mechanical behaviour is ensured even when the porosity of zone 54 reaches high values.

What is claimed is:

1. A liquid metal-cooled fast neutron nuclear reactor comprising: a vessel, a horizontal slab closing said vessel; a core cover plug suspended from said slab and having a vertically axed external ferrule surrounding control rod guidance sleeves and also vertically axed liquid metal sampling tubes; said ferrule supporting a horizontal core cover plate traversed by said sleeves and tubes; said core cover plug also comprising: at least one grid located below the core cover plate; each grid having a horizontal, annular, peripheral plate connected in fixed manner to the core cover plate and also having a plurality of horizontal modular plates separate from said peripheral plate, each of said modular plates being fixed to at least one of the sleeves and/or tubes, said modular plates and said peripheral plate defining therebetween passages for the liquid metal, wherein the modular plates of the same grid are vertically downwardly displaced on moving away from the said ferrule axis.

2. A liquid metal-cooled fast neutron nuclear reactor comprising: a vessel, a horizontal slab closing said vessel; a core cover plug suspended from said slab and having a vertically axed external ferrule surrounding control rod guidance sleeves and also vertically axed liquid metal sampling tubes; said ferrule supporting a horizontal core cover plate traversed by said sleeves and tubes; said core cover plug also comprising: at least one grid located below the core cover plate; each grid having a horizontal, annular, peripheral plate connected in fixed manner to the core cover plate and also having a plurality of horizontal modular plates separate from said peripheral plate, each of said modular plates being fixed to at least one of the sleeves and/or tubes, said modular plates and said peripheral plate defining therebetween passages for the liquid metal, the modular plates of the same grid being vertically upwardly displaced on moving away from said ferrule axis.

3. A reactor according to claim 2, wherein edges of adjacent modular plates and the peripheral plate of the same grid form therebetween clearances in a horizontal direction.

4. A reactor according to claim 2, wherein edges of adjacent modular plates and the peripheral plate of the same grid are vertically aligned.

5. A reactor according to claim 2, wherein edges of adjacent modular plates and the peripheral plate of the same grid partly overlap in a horizontal direction.

6. A reactor according to claim 2, wherein said ferrule is fixed to the peripheral plate and has perforations below the core cover plate.

7. A reactor according to claim 2, wherein the lower end of the ferrule is fixed to the core cover plate, the peripheral plate being suspended on the core cover plate by tie bolts.

8. A reactor according to claim 7, wherein the external diameters of the core cover plate and the peripheral plate slightly exceed the external diameter of the ferrule, a break being provided on the periphery of the peripheral plate for the passage of handling means.

9. A reactor according to claim 2, wherein the core cover plug comprises a deflecting grid located in the vicinity of lower ends of the sleeves and tubes and a grid forming a heat shield located between the deflecting grid and the core cover plate.

* * * * *